3,354,180
METHOD FOR THE TREATMENT OF FORMS FOR MOLDING CONCRETE WITH WAX EMULSION RELEASE AGENT
Marilyn J. Ekiss, Seattle, Wash., George A. Weisgerber, Cranford, N.J., and Theodore F. Hand, Houston, Tex., assignors to Esso Research and Engineering Company, a corporation of Delaware
No Drawing. Filed June 21, 1962, Ser. No. 204,088
11 Claims. (Cl. 264—338)

This invention relates to a wax emulsion and its use as a concrete mold release agent. Particularly, the invention relates to a water emulsion of wax, which emulsion is useful for coating rigid forms used for molding concrete.

A number of structures such as prestressed bridge slabs, pilings and pipe, building blocks, burial vaults, bridges, dams, housing foundations, etc., are cast by pouring concrete into forms made of steel, wood, heavy cardboard, Masonite, plywood, etc., and then later removing the forms from the hardened concrete. To help reduce the sticking of the concrete to the forms, and to give easier release of the concrete from the mold, a mold release agent is generally used. An extremely wide variety of materials intended to serve as mold release agents have been used for this purpose, such as waterproof kraft or asphalt papers, shellac, lacquers, muslin, castor oil, mineral oil, crankcase drainings, compounded petroleum oils, etc. However, many of these materials have various deficiencies or are limited in their use. For example, paper or cloth leaves unwanted marks, especially if the material overlaps or wrinkles, while many of the oil type mold release agents leave stains or unwanted residual deposits. Other common deficiencies are: soaking of the release agent in porous (e.g. wooden) mold forms, excessive run-off or formation of non-uniform films, inconvenience or messy in application, inefficient in preventing bonding, etc. On the other hand, the wax emulsions of the invention do not have these disadvantages while having many desirable properties. Thus, the wax emulsion type concrete form release agent of the invention can be applied to the form conveniently by spraying or painting and will spread to a uniform thin film. Wasteful over-application, which is necessary with some release agents, is avoided. After application of the thin film, it will set up rather quickly by evaporation of the water, leaving a moderately hard protective layer, and will not stain the adjacent concrete surface.

Mold release agents of this invention are prepared by emulsifying certain types of petroleum waxes into water. Specifically, suitable water emulsions can contain about 2 to 40 wt. percent wax and about 0.1 to 5.0 wt. percent of emulsifying agent. Preferred compositions contain 5 to 25 wt. percent wax, and 0.5 to 3.0 wt. percent of emulsifying agent. For convenience of handling, these emulsions are preferably made up in the form of concentrates containing about 20 to 60% wax and about 1 to 8 wt. percent emulsifying agent, and are later diluted with additional water before use by simple mixing.

The waxes used in the mold release composition of this invention include petroleum waxes having melting points (EMP) of 100 to 185° F., preferably 115 to 165° F. These waxes will generally contain from 0.2 to 40 wt. percent, preferably 0.2 to 25 wt. percent of mineral oil.

Waxes of the above description include refined paraffin wax generally having about 0.1 to 0.5 wt. percent mineral oil and consisting essentially of straight chain alkaline of 16 to 50 carbon atoms, and generally melting in the range of about 110° to 165° F.

Waxes of the above description also include the so-called microcrystalline waves which are obtained as by-products from the dewaxing of heavy mineral oil stocks, such as heavy lubricating oil distillate, cylinder oils, bright stocks, etc. These waxes usually contain less than 5 wt. percent oil, and preferably contain less than 2 wt. percent oil. Microcrystalline wax differs from paraffin wax in that it contains a substantial portion of branched chain hydrocarbon and the hydrocarbons are of higher molecular weight. Microcrystalline waxes are generally more plastic than refined paraffin waxes and generally have melting points of about 130 to 185° F.

Instead of using refined paraffin wax, various crude paraffin waxes having higher oil contents can be used, such as slack wax which contains about 10 to 40 wt. percent mineral oil and generally has a melting point between about 115 and 160° F., and scale wax which contains about 0.5 to 4 wt. percent mineral oil and has a melting point between about 125 and 150° F. Correspondingly, petrolatum can also be used. Petrolatum is a crude microcrystalline wax usually containing about 10 to 40 wt. percent mineral oil and generally having a melting point of about 120 to 160° F.

A number of emulsifiers can be used to make the emulsion. One type of emulsifier which was found particularly effective is the fatty acid partial ester of an aliphatic polyhydric alcohol. These partial esters include the $C_{12}$ to $C_{22}$ fatty acid partial esters of aliphatic polyhydric alcohols having about 3 to 12, e.g. 3 to 8, carbon atoms, and about 2 to 8, e.g. 3 to 6, hydroxy groups per molecule. Preferred materials are the mono- and diesters of $C_3$ to $C_6$ fatty acids. The above type of partial esters includes the partial esters of monodehydrated aliphatic polyhydric alcohols, which are well known in the art, of example, see U.S. Patent 2,434,490, as well as partial esters of non-dehydrated aliphatic polyhydric alcohols, e.g. pentaerythritol monooleate.

Specific examples of the above types of partial esters will include: glyceryl monooleate, pentaerythritol monooleate, sorbitan monooleate, the dioleates of sorbitan, mannitan, pentaerythritol and related polyhydric alcohols, the corresponding partial stearic and palmitic acid esters of these alcohols, and partial esters of these alcohols made from mixtures of these fatty acids.

Also partial esters of the above type can be further reacted with alkylene oxide such as ethylene oxide, propylene oxide, etc. to incorporate about 1 to 30 alkoxy groups into each partial ester molecule. Alkylene oxide treated materials of the above type are well known and have been described in detail in U.S. Patents 2,374,931 and 2,380,166.

Other useful classes of emulsifying agents including non-ionic and cationic surface active agents which will emulsify the wax of the general formula:

$$R-[(R'O)_x-H]_y$$

wherein R' is an aliphatic hydrocarbon radical having 2 to 4 carbon atoms; x is an integer of 5 to 200, e.g. 5 to 75; and y, which is either 1 or 2, is the valence of R; while R is a radical selected from the group consisting of: HO—; R″O—; R″COO—; and R″CON=; wherein said R″ is a straight or branched chain alkyl group containing 2 to 30, e.g. 4 to 20, carbon atoms which can be derived from a fatty acid.

When R represents an R″N= radical, the formula represents N, N polyalkyleneoxy disubstituted alkyl amines such as

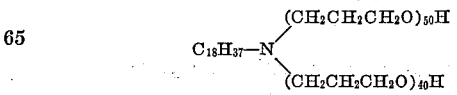

When R represents R″COO— and R″CON=, specific compounds will include

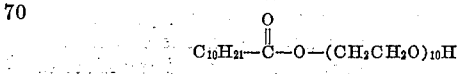

and

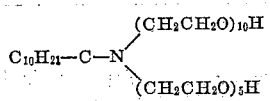

Surface active agents of the above general types are well known and are available under trade names such as Ethomeens, Ethomids, Ethofats, Pluronics, etc.

The preceding surface active agents are stable and do not irreversibly change upon evaporation of the water component of the emulsion. The result is that after the coated form is removed from the hardened concrete, the form can be cleaned with fresh water which will tend to re-emulsify the wax residue of the dried-out emulsion. Because of this re-emulsifying feature, the forms are readily cleaned after use by rinsing or washing with water. However, in some instances it is preferred to use an emulsifier which will not re-emulsify the wax once the original water content has evaporated. Thus, for casting outdoors, to avoid the effect of rain wash-off of the dried emulsion, such non-re-emulsifying agents are preferred. A very desirable class of such agents are salts of $C_{12}$ to $C_{22}$ fatty acids with volatile amines such as ammonia, morpholine, monoethanolamine, triethanolamine, etc. These salts are made by simple mixing of the fatty acid and the amines. The addition products or salts can be prepared directly in the emulsion mixture at the time of emulsification.

Specific examples of such salts are the stearic acid salt of morpholine; triethanolamine stearate; ammonium laurate; ammonium stearate; etc.

Various other additive materials may also be included in the compositions of the invention in amounts of about 0.0002 to 10.0 wt. percent each, based on the total weight of the composition. Such additives include: additives used in the wax to prevent oxidation of the wax while in storage prior to manufacture of the emulsion; additives for aiding stability of the emulsion such as gums, methyl or ethyl cellulose, carboxy vinyl compounds (e.g. "Carbopol 941"), fatty alcohols, gelatins and the like; additives for prevention of bacteria or fungus growth in the emulsion such as tri-hydroxymethyl-nitromethane, available under the tradename "Tris-nitro"; additives for improvement of the hardness and water resistance of the wax film deposited from the emulsion, including various resinous materials such as rosin and its derivatives, and polymerized petroleum resins; and additives to impart color to the wax films; etc.

The compositions of the invention are preferably prepared in the form of concentrates containing about 20 to 60 wt. percent of the wax. These concentrates can then be readily cut back with additional water to form final compositions containing about 2 to 40 wt. percent wax, and preferably 5 to 25 wt. percent wax. The concentrates are readily prepared by heating the wax and emulsifier together to a temperature about 20° F. above the melting point of the wax and slowly adding water at approximately the same temperature while agitating so that phase inversion of the emulsion occurs. That is, the emulsion changes from a water-in-hydrocarbon emulsion to a hydrocarbon-in-water emulsion system. Mechanical homogenization also may be used if necessary, to improve the dispersion, making a very uniform stable distribution of fine particles of emulsified wax. The concentrate can then be diluted at room temperature with additional water by simple mixing, prior to the actual application of the emulsion. The final diluted product can be applied to the mold forms by mopping, swabbing, spraying, dipping, brushing, rolling, etc. Spraying is generally preferred, using either a hand or blower operated spray, to obtain a uniform and economical coating. In any event, the compositions of the invention are applicable by any of the above methods. After the wax emulsion is applied to the form, it is allowed to dry by evaporation of the water to leave a coating of wax on the form surface. After drying, the form is then used to mold concrete.

In general, the wax emulsions of the invention are easy to apply, will adhere well to all form surfaces including vertical and inverted members, will not permanently stain concrete surfaces and do not leave residues that will interfere with further treatment, e.g. painting, of the concrete surfaces. They will also permit easy break-away of the form from the hardened concrete, will waterproof wooden and other water-absorbent forms to thereby permit their repeated use, and will generally inhibit rusting of steel forms and metal equipment.

The invention will be further understood from the following examples which include a preferred embodiment of the invention.

The physical properties of the waxes used in preparing the examples of the invention are summarized in Table I, which follows:

TABLE I.—INSPECTIONS OF WAX STOCKS

| | Paraffin Wax I | Paraffin Wax II | Slack Wax III | Slack Wax IV | Slack Wax V | Paraffin Wax VI |
|---|---|---|---|---|---|---|
| Melting Point, ° F. (ASTM D-127) | 124 | 130 | 150 | 118 | 131 | 123 |
| Oil Content, percent (ASTM D-721) | 0.2 | 0.3 | 23 | 23 | 23 | 0.2 |
| Viscosity at 210° F., cs. (ASTM D-445) | 3.0 | 3.8 | 7.4 | 3.57 | 6.4 | 2.9 |
| Distillation (ASTM D-1160) 760 mm., ° F.: | | | | | | |
| 5% | 713 | 730 | 730 | 720 | 805 | 723 |
| 50% | 747 | 786 | 910 | 779 | 915 | 762 |
| 95% | 807 | 871 | 1,080 | 856 | 1,005 | 797 |

Paraffin Wax I was prepared from a contiguous-boiling waxy distillate lubricating oil stream, refined by conventional solvent crystallization, filtration, hydrogen treating and bauxite percolation processes.

Paraffin Wax II was prepared from a mixture of two separate slack waxes from non-contiguous waxy lubricating oil distillate streams. That is, the mixture of slack waxes (Paraffin Wax II) were prepared from Slack Wax IV and Slack Wax V. The mixed Slack Waxes IV and V were processed together through the conventional processes of solvent crystallization to reduce the oil content, filtration, hydrogen treating and bauxite percolation.

Slack Wax III was prepared from a moderately high boiling lubricating oil distillate stream by conventional processes of dewaxing said distillate stream by solvent crystallization.

Paraffin Wax VI was prepared by a method of manufacture similar to the method of preparing Paraffin Wax I.

EXAMPLE I

Three concentrates, designated A, B, and C were prepared. These compositions are given in Table II in parts by weight:

TABLE II.—COMPOSITION OF WAX EMULSION CONCENTRATES USED IN LABORATORY CONCRETE MOLD RELEASE EVALUATIONS

| Composition (wt. percent) | Concentrate | | |
|---|---|---|---|
| | A | B | C |
| Paraffin Wax I | 45.0 | | |
| Paraffin Wax II | | 46.0 | |
| Slack Wax III | | | 43.0 |
| Span 60 (Sorbitan monostearate) | 2.0 | | 3.0 |
| Tween 60 (polyoxyethylene sorbitan monostearate) | 2.0 | | 3.0 |
| Stearic Acid | | 2.7 | |
| Morpholine | | 0.3 | |
| Water | 51.0 | 51.0 | 51.0 |
| | 100.0 | 100.0 | 100.0 |
| Tris Nitro | 0.04 | 0.00 | 0.04 |

Concentrates A and C were prepared by dissolving the Tween 60 in the water and the Span 60 in the wax in separate vessels, each solution being made at a temperature of about 165° F., the emulsion was then made by adding the hot water solution to the hot wax or petrolatum solution with stirring. The solution was then homogenized and the fungicide was then added. Concentrate B was formed in a similar manner except that the morpholine was dissolved in the water and the stearic acid in the wax in separate vessels, each solution being made at a temperature of about 155° F., the emulsion was then made by adding the wax phase to the water phase, with stirring, followed by homogenization under high shear conditions.

The Span 60 and Tween 60 are commercial emulsifiers and are of the partial ester type and the alkylene oxide-treated partial ester type respectively. The Tween 60 averages about 20 oxyethylene groups per molecule. The Span 60 and Tween 60 are 100% active ingredient.

The Emulsion Concentrates of Table II were diluted by simple mixing with additional water, and the diluted emulsion was then applied to clean steel panels by dipping, then allowing the panels to drain and dry. A tubular cylinder was set on each of the dried panels and wet concrete was poured into the cylinder and allowed to harden. The cylinder with the hardened concrete was then removed from the panel. For comparison, concrete was also cast with the cylinder on untreated steel panels. Also, for comparison, tests were made using a commercial mold release agent. In each case, the area of contact between the steel panel and the concrete was graded for:

(a) Form break-away, i.e. the ease of separating the steel form or panel from the hardened concrete coating.

(b) Concrete holdover, i.e. the relative amount of concrete adhering to the separated steel panel.

(c) Form clean-up, i.e. the ease of cleaning the separated steel panel.

(d) Rusting of the form, i.e. the degree of rust that resulted on the panel during the test.

The compositions tested and the results obtained are summarized in following Table III.

TABLE III.—EVALUATION OF WAX EMULSION RELEASE AGENTS

| | Untreated Panel | Treated Panel | | | | | | Commercial Oil Base Agent |
|---|---|---|---|---|---|---|---|---|
| | | Emulsion Concentrate A | | Emulsion Concentrate B | | Emulsion Concentrate C | | |
| Dilution ratio, water to emulsion concentrate | | 2/1 | 4/1 | 2/1 | 4/1 | 2/1 | 4/1 | Undiluted. |
| Form break-away | V. difficult | Good | Good | Good | Good | V. easy | V. easy | V. easy. |
| Concrete holdover | Appreciable amt | Slight | Slight | Slight | Slight | V. slight | V. slight | Slight. |
| Form clean-up* | V. difficult | Wipes off | Wipes off | Wipes off | Wipes off | V. easy | V. easy | Wipes off. |
| Rusting of form | Slight to heavy | Slight | Slight | None | V. slight | Slight | Slight | None. |

*The form is cleaned for re-use by washing, wiping or brushing to remove adhering cemens particles from previous casting.

As seen from Table III, the emulsions of the invention performed very well in all tests and compared well with the commercial oil base agent which was used in an undiluted form. From an economic standpoint, the wax emulsions (diluted in a 4:1 ratio) will have a selling price on the order of about one-sixth of the selling price of the oil base commercial agent which is used without dilution. Emulsion Concentrate C of Table III gave particularly good results in that the form break-away was very (V.) easy with very slight concrete holdover, while form clean-up was also very easy. On the other hand, the completely untreated panel was very difficult to break-away from the hardened concrete, the amount of concrete adhering to the untreated panel was appreciable and the clean-up of the untreated panel was very difficult.

EXAMPLE II

A composition of the invention was prepared and used in actual field tests. This composition was made by dilution of a concentrate having the following formulation:

| Emulsion Concentrate D: | Weight percent |
|---|---|
| Paraffinic Wax VI | 45.50 |
| Span 60 | 2.25 |
| Tween 60 | 2.25 |
| Water | 50.00 |

Concentrate D was prepared in the same manner as Concentrates A and C of Example I.

Steel forms for molding two bridge slabs and thirty-six piling sections were coated with Concentrate D diluted with 4 parts of water. The diluted wax emulsion was sprayed from a 45 gallon tank with 50 p.s.i. air pressure through long ½″ hoses and spray nozzles at a rate of 300 sq. ft. per gallon on the slab forms and 600 sq. ft. per gallon on the piling forms. The bridge slabs were molded in wax emulsion coated web shaped steel forms, with the top finished to a roadway surface, 30 ft. x 60 ft. The webs were 4 ft. in depth and the slab weights were approximately 160 tons. Steel cables stressed at 160,000 p.s.i. are in the lower concrete web. A net-work of heavy steel reinforcing bars are in the flat section of the slab. The steel forms have approximately 5,000 sq. ft. of surface that were coated with the wax emulsion. The sides of the steel form webs are retractable with a screw mechanism.

The concrete sq. pilings are cast around steel cables stressed to 160,000 p.s.i. and a net work of reinforcing bars and wire. The piling has a round hollow core which was formed by casting around a wax/plastic coated fiber pipe equal to about ½ the volume of the total dimensions of the finished piling. The concrete was poured into collapsible 3-sided steel forms which vary in size from 12″ to 30″ widths and 10 to 40 ft. lengths.

In the preceding tests, a day was spent in pouring the concrete and another day in steam curing of the concrete under plastic covers. The third day was spent in separating the slabs from the forms, cleaning the forms, fitting cables and reinforcing steel, etc. In this actual field test, the forms were easily removed after the concrete had hardened, the appearance of the cast concrete surface was excellent, there was very little concrete holdover on the steel forms and the form clean-up was excellent.

The preceding example is summarized in Table IV which follows:

TABLE IV.—CONCRETE CASTING USING WAX EMULSIONS

|  | Concrete Roadway Bridge Slabs | Concrete Square Pilings |
|---|---|---|
| Size of casting | 30 ft. x 60 ft. x 4 ft. web depth. | Up to 30 inches sq. x 110 ft. length. |
| Number of castings | Two | Thirty-six. |
| Emulsion Concentrate used. | D | D. |
| Dilution ratio with water. | 4 parts water, 1 part emul. conc. D. | 4 parts water, 1 part emul. conc. D. |
| Application Rate | 300 sq. ft. per gallon of diluted wax emulsion. | 600 sq. ft. per gallon of diluted wax emulsion. |
| Form removed | Easy | Easy. |
| Appearance of cast concrete surface. | Excellent | Excellent. |
| Concrete holdover on form. | Very little | Very little. |
| Form clean-up | Excellent | Excellent. |

EXAMPLE III

Emulsion Concentrate E was prepared in the same general manner as Emulsion Concentrate B of Example I. The composition and properties of Emulsion Concentrate E are summarized in Table V which follows:

TABLE V.—EMULSION CONCENTRATE E

Composition (wt. percent):
  Slack Wax similar to Slack
    Wax III of Table I ____ 45.95.
  Stearic Acid _____ 2.20.
  Morpholine _____ 0.80.
  Carbopol 941 _____ 0.02.
  Water _____ 51.00.
Properties:
  Viscosity @ 73° F., cps. __ 4000.
  Wax particle size, diameter, microns _____ 5–10.
  pH (electrometric) _____ 9.0.
  Shelf stability _____ No separation at 40°, 73° and 125° F. after 1 month.
  Dilution with hard water __ Satisfactory.

Carbopol 941 is a water-soluble thixotropic thickener-emulsifier used to improved shelf stability. It is a carboxy vinyl polymer and is supplied as an acid in a dry powder form. Neutralization increases the viscosity sharply. For this reason the Carbopol must be completely dissolved in the water before morpholine is added and before the emulsion is made. Carbopol may be used in any of the anionic emulsions at 0.01 to 0.05 wt. percent without otherwise modifying the formula. A concentration of 0.02 wt. percent is usually most suitable.

The Emulsion Concentrate E can be diluted with 2 to 4 times its volume with water and used in the manner illustrated by Examples I and II.

In many applications, the "quick-breaking" charactertistics of the anionic emulsion, such as that of Emulsion Concentrate E will be of value. These emulsions are considerably more resistant to re-dispersion or wash-off than the nonionic emulsions represented by Emulsion Concentrates A, C and D. In addition, the anionic emulsions are less subject to bacteria and fungi attack, and are more stable undiluted. On the other hand, the nonionic emulsions have better tolerance for hard water; i.e., the nonionic emulsions remain better dispersed in solutions of metal ions, acids and bases. These points are compared in Table VI which follows:

TABLE VI.—GENERAL COMPARISON OF NONIONIC AND ANIONIC WAX EMULSION CHARACTERISTICS

| | |
|---|---|
| Low sensitivity to divalent metal ions, hydroxyl, and hydrogen ions. | Sensitive to water hardness above 250 p.p.m. to varying degrees. Dilution with 1000 p.p.m. hard water is an upper limit. |
| High dilution (10% wax) remains dispersed without stirring. | High dilution (10% wax) requires periodic agitation to retain homogeneity. (No permanent loss in quality of diluted emulsion, however.) Very stable as concentrate. |
| Dried films sensitive to water (slough off or redisperse). | Not redispersable after drying. |
| Subject to attack by bacteria and fungi unless fortified with bactericide-fungicide additive. | Fungi and bacteria attack is controlled by morpholine. |

What is claimed is:

1. A method for the treatment of forms for molding of concrete to prevent sticking of concrete to said forms and to permit the removal of said forms from hardened concrete, which comprises applying to said forms a wax emulsion release agent consisting essentially of water containing about 2 to 40 wt. percent of a petroleum wax and about 0.1 to 5.0 wt. percent of an emulsifying agent, all of said wt. percent being based upon the total weight of said release agent, and allowing said release agent to dry whereby the water evaporates to leave a solid waxy film on said forms.

2. A method according to claim 1, wherein said emulsifier is a $C_{12}$ to $C_{22}$ fatty acid partial ester of a $C_3$ to $C_{12}$ aliphatic polyhydric alcohol having 2 to 8 hydroxy groups per molecule.

3. A method according to claim 1, wherein said emulsifier is an alkylene oxide treated partial ester of a $C_{12}$ to $C_{22}$ fatty acid and a $C_3$ to $C_{12}$ aliphatic polyhydric alcohol having 2 to 8 hydroxy groups per molecule, wherein the number of alkylene oxide groups incorporated per molecule of said partial ester is about 1 to 30, and said alkylene oxide is a $C_2$ to $C_4$ alkylene oxide.

4. A method according to claim 1, wherein said emulsifier is a salt of a $C_{12}$ to $C_{22}$ fatty acid and a volatile amine, which salt will decompose upon evaporation of said water to prevent re-emulsification of said wax.

5. A method according to claim 1, wherein said emulsifier is sorbitan monooleate.

6. A method according to claim 1, wherein said emulsifier is sorbitan monostearate alkoxylated with about 20 oxyethylene groups per molecule.

7. A method according to claim 1, wherein said emulsifier is a salt of stearic acid and morpholine.

8. A method according to claim 1, wherein said wax is a petroleum wax having a melting point of 100 to 185° F. and a mineral oil content of 0.2 to 40 wt. percent.

9. A method according to claim 1, wherein said wax is a refined paraffin wax having a melting point of about 110 to 165° F. and containing about 0.1 to 0.5 wt. percent mineral oil.

10. A method according to claim 1, wherein said wax is a slack wax having a melting point of about 115 to 160° F. and a mineral oil content of 10 to 40 wt. percent.

11. A method of molding concrete shapes in metal forms designed for reuse which comprises applying to said forms a wax emulsion release agent consisting essentially of water containing about 2 to 40 wt. percent of a petroleum wax and about 0.1 to 5.0 wt. percent of an emulsifying agent, all of said wt. percent being based upon the total weight of said release agent, allowing said release agent to dry whereby the water evaporates to leave a solid waxy film on said forms, pouring wet concrete into said forms, allowing said concrete to harden and then removing said forms from said concrete after said concrete hardens.

References Cited

UNITED STATES PATENTS

| | | | |
|---|---|---|---|
| 2,251,824 | 8/1941 | Edwards | 106—38.22 |
| 2,374,931 | 5/1945 | Griffin | 106—271 |
| 2,400,001 | 5/1946 | Grupelli | 264—338 |
| 2,451,362 | 10/1949 | Snyder | 106—38.25 |
| 2,598,666 | 6/1952 | Sesso et al. | 106—271 |
| 2,684,948 | 7/1954 | Cross | 106—271 |
| 2,770,859 | 11/1956 | Henry | 106—38 |
| 2,893,880 | 7/1959 | Dieman et al. | 106—271 |
| 2,901,361 | 8/1959 | Miesel | 106—38.23 |
| 2,911,309 | 11/1959 | Rudel et al. | 106—271 |
| 2,937,950 | 5/1960 | Tillman | 106—243 |
| 3,000,753 | 9/1961 | Rockland | 106—271 |
| 3,086,871 | 4/1963 | Sheldahl et al. | 106—271 |

FOREIGN PATENTS 733,783    7/1955    Great Britain.

ALEXANDER H. BRODMERKEL, *Primary Examiner.*

MORRIS LIEBMAN, *Examiner.*

J. B. EVANS, *Assistant Examiner.*